Patented May 5, 1931

1,804,245

UNITED STATES PATENT OFFICE

DANIEL C. BRUCE, OF NASHVILLE, TENNESSEE

COMPOSITION OF MATTER

No Drawing.   Application filed April 26, 1927.  Serial No. 186,818.

This invention relates to a composition of matter and it is an object of the invention to provide a composition of a soft putty consistency and which is particularly intended to be used as a filler in connection with the application of commercial wall board manufactured from fibres obtained from cane, asbestos, wood, flax, straw, or other absorbitant fibres such as, and including, the wall board now used and manufactured and known as Celotex, Beaver board, Sheetrock, Best-wall, Masonite, Insolite, Gypsolite, Rockboard, Cornell, or Upson wall board, and other boards made from cane, asbestos, wood, flax, straw, or gypsum.

Another object of the invention is to provide a composition of this kind which is particularly intended for use in the filling of joints, covering nail heads and coating the surface of wall board, etc.

An additional object of the invention is to provide a composition of this kind which is adapted to produce an invisible joint; to take the place of plaster, coating, or paint; and upon the omission of fibrous matter to produce a liquid composition for sizing walls before the application of paint or wall paper.

One embodiment of my invention comprises the following admixture in substantially the proportions given:

Water _____ 1 pt.
Flour _____ 1 lb.
Whiting or powdered chalk_____ 4 oz.
Glucose or corn syrup equal to crystal commercial quality No. 43_____ 4 oz.
Borax _____ 2 oz.
Pure white soap (powdered or liquid) _1½ oz.
Glycerine _____ 5 liquid oz.

After the foregoing ingredients have been thoroughly kneaded to a dough there is added thereto four pints of boiling water and mixed thoroughly while hot.

When the foregoing admixture has cooled there is added thereto one-half pint of a hydrocarbon, such as gasoline and kerosene mixed in proportions of 75% gasoline and 25% kerosene. Other hydrocarbons such as benzene or benzole may be substituted for the gasoline and kerosene because in connection with the soap they make an emulsion and act as a preservative. Also hydrocarbons have a tendency to increase the flexible qualities of the finished product when dry.

There is then added one pound of comminuted fibres taken from cane fibre or Celotex wall board fibres obtained from asbestos, wood, straw, or other absorbitant fibres. These fibres are thoroughly mixed with the admixture and kneaded until it forms a putty-like product.

In order to match the Celotex wall board in color when cane fibres are used, suitable coloring matter soluble in water may be added to the first named admixture to obtain desired tints although ordinarily the composition when dry, owing to the action of the whiting or powdered chalk, causes the fibres to dry light in color and thus prevent water stain.

If cold water be used in connection with the first admixture instead of hot water, the dry ingredients are first thoroughly mixed together with the further addition of one-tenth pound of sodium hydroxide powder and one-tenth pound of ammonium sulphate before the water, glucose, glycerine, and soap are added. After these last mentioned ingredients have been added the resultant mixture is then mixed in five pints of cold water.

In lieu of the glucose or corn syrup there may be used 4 oz. of dextrin; 2 oz. of gum arabic; 1 oz. of ground glue; or 2 oz. of sugar, and in lieu of the flour 1 lb. of starch may be employed.

When cane fibres obtained from Celotex products are used the same should first be treated to obtain a color uniform with the board by thoroughly mixing the same by the following manner:

Water _____ 1 qt.
Glycerine_____ 5 liquid oz.
Soap _____ ½ oz.
Whiting _____ 2 oz.
Borax _____ 1 oz.
Fibres _____ 10 oz.

After the fibres have absorbed all of the liquid, the same are allowed to dry out until the fibres appear to be dry which in fact are slightly moist. When treated fibres are substituted in the first admixture herein set forth, the items specified will be reduced to the following proportions:

| | |
|---|---|
| Whiting | 2 oz. |
| Borax | 1 oz. |
| Soap | 1 oz. |

Glycerine may be omitted as the treated fibres contain sufficient quantity.

The fibres obtained from Celotex products to be mixed with the first given formula need not be especially treated to obtain a good result but an improved appearance in texture and color will be obtained after the crack filler has become dry if the fibres have the special treatment. This special treatment also has a tendency to produce a more flexible product when dry.

I have also found in practice that by omitting the use of fibre in connection with the first given formula a liquid wall size is obtained although better results are effected if the glycerine is reduced to 1 oz. or omitted entirely and the glucose increased to 12 oz., or the glue to 1 oz., or the dextrin to 4 oz., or the sugar to 2 oz. It may be possible, however, to use other proportions with good results for the purpose of making wall size for filling walls and ceilings made from wall board or plaster.

I claim:—

1. A filling composition for fibre board surfaces comprising an admixture of water, flour, whiting, a substance from the group comprising glucose and dextrin, borax, soap, glycerine, a volatile hydrocarbon, and comminuted fibrous materials, in the proportions specified.

2. A filling composition for fibre board surfaces comprising an admixture of water, flour, whiting, a substance from the group comprising glucose and dextrin, borax, soap, glycerine, and a volatile hydrocarbon, in the proportions specified.

In testimony whereof I hereunto affix my signature.

DANIEL C. BRUCE.